United States Patent [19]
Dry

[11] 3,864,867
[45] Feb. 11, 1975

[54] PEST CONTROL PACKAGE

[76] Inventor: Clinton H. Dry, 1244 Juniper Ave., Redwood City, Calif.

[22] Filed: Nov. 1, 1973

[21] Appl. No.: 411,661

[52] U.S. Cl. ............................................. 43/131
[51] Int. Cl. ....................... A01m 1/20, A01m 25/00
[58] Field of Search ....................................... 43/131

[56] References Cited
UNITED STATES PATENTS
| | | | |
|---|---|---|---|
| 3,008,262 | 11/1961 | Ronicker | 43/131 |
| 3,108,391 | 10/1963 | Sipos | 43/131 X |
| 3,643,371 | 2/1972 | Gordon | 43/131 |

*Primary Examiner*—Louis G. Mancene
*Assistant Examiner*—Daniel J. Leach
*Attorney, Agent, or Firm*—Guy A. Greenawalt

[57] ABSTRACT

A package for pest or odor control or the like which is characterized by a cylindrical container having a detachable lid with an exterior pressure sensitive adhesive thereon enabling ready attachment to an overhead support surface and top and bottom interior anchoring means for retaining in the container a cartridge of a deodorant or pest control material of lesser diameter than the interior diameter of the container with the container having a series of apertures in the side walls enabling diffusion and escape from the container of a deodorant material in the form of vapor or gas, or providing access to the enclosed pest control material by flying or crawling insects or rodents.

7 Claims, 5 Drawing Figures

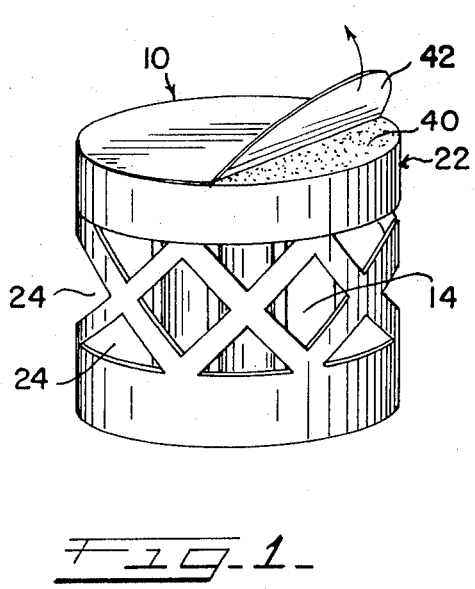
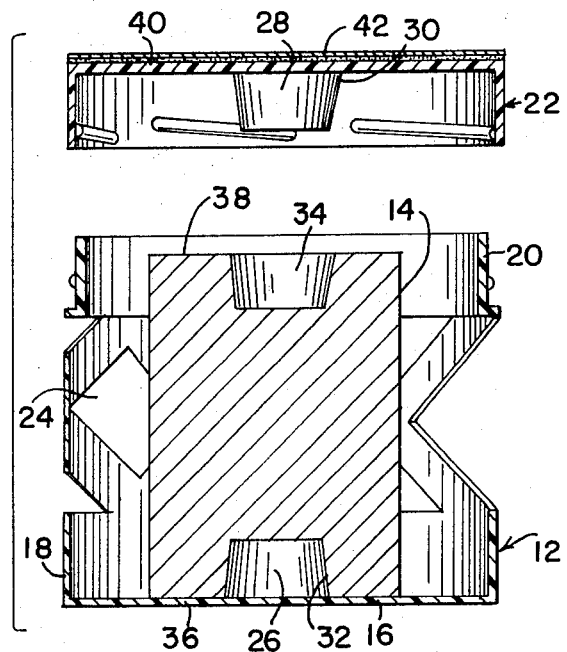
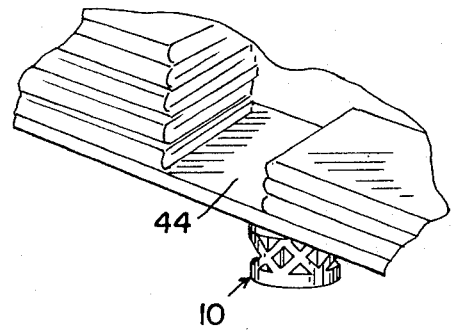
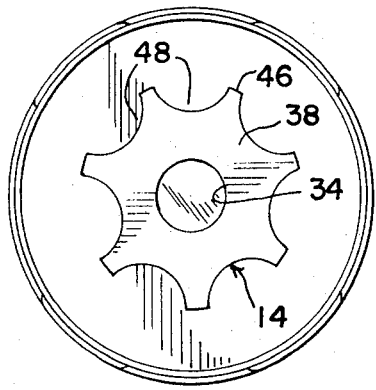
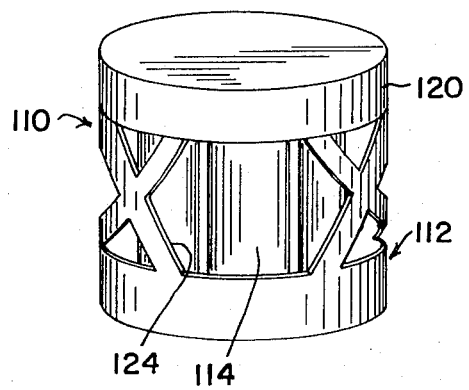

PEST CONTROL PACKAGE

This invention has to do with the provision of odor or pest control devices for use in various locations in and around a dwelling or other building and is more particularly concerned with an improved container for enclosing a cartridge which, when used, affords maximum diffusion of a cartridge or deodorant material or maximum utilization of a cartridge of insect or rodent control material.

Many container type packages have been developed heretofore for dispensing deodorants of various kinds in dwellings or other enclosures in which the deodorants have generally been in the form of crystals or liquids. In some prior arrangements the material has been in a more or less solid state usually being merely placed loosely in the container with some means for allowing the escape of the material in the form of vapor or gas from the container. Packages of a similar type have also been available for use in providing insect and rodent control material in a convenient form and location for attracting insects or rodents of various kinds. The insecticides, rodent bait or other forms of material have generally been furnished in a container of some type which affords some degree of safety and convenience in use but most often material of this type is furnished for use outside of the container where it is too readily available for improper or undesired use by small children, pets or the like, sometimes resulting in serious injury to a child or loss of a pet. In some prior arrangements reusable containers have been furnished which may be refilled with the material in cartridge or other form when the initial supply is exhausted. Many materials of this type may be found in cartridge form for use either unclosed in the form furnished or in a suitable container.

It is a general object of the present invention to provide a package arrangement which is adapted for use in the control of odors, insects or rodents, which embodies a novel container for enclosing control material in the form of a cartridge and which is adapted for repeated or continuous use by merely replacing the cartridge of control material when needed.

It is a further object of the invention to provide a package arrangement for odor, insect or rodent control which embodies a container having means therein for securing therein, to the best advantage for use, a cartridge of material of the proper kind for the control desired.

Another object of the invention is to provide a package arrangement for the purpose described which includes a container having means for enclosing therein in a fixed position a cartridge of the desired control material in solid form which has a fluted exterior surface and which is dimensioned so that the exterior surface is spaced from opposed container walls.

Still another object of the invention is to provide a package arrangement for the purpose described which includes a generally cylindrical container with top and bottom closure members having means in the container for engaging in fixed position a cartridge of odor, insect or rodent control material and with a container wall disposed opposite a cartridge side wall having apertures which afford restricted access to the control material from the container exterior and which permit the escape of control material which will vaporize.

A further object of the invention is to provide a package arrangement for the purpose described which embodies a container having apertured walls and a means for securing therein in fixed relation a cartridge of control material so as to reduce the risk of unsafe or improper use, as by small children, pets or the like, without knowledge of the nature of the package and its intended purpose.

These and other objects and advantages of the invention will be apparent from a consideration of the several forms of package which are shown by way of illustration in the accompanying drawings wherein:

FIG. 1 is a perspective view of a package which incorporates therein the principal features of the invention;

FIG. 2 is a vertical section through the package of FIG. 1 with the top cover member removed and positioned above the container body;

FIG. 3 is a top plan view of the package with the cover member removed;

FIG. 4 is a perspective view showing the package suspended beneath a linen closet shelf; and FIG. 5 is a perspective view of a modified form of the package.

The package arrangement 10 which is illustrated in FIGS. 1 to 4 is adapted for use as a deodorant dispenser or an insect control device, as desired. It comprises a generally cylindrical container 12 in which there is contained a cartridge 14 with the material of the latter being dictated by the desired use of the package. If it is desired to use the package 10 for deodorizing a clothes closet or similar enclosure or area the cartridge 14 will be formed of a suitable deodorant material, such as, for example, in the case of the closet, perfumed paradichlorobenzine which will also serve as a moth control. A charcoal cartridge can be used for odor control in a refrigerator. For use in other areas for this purpose other materials will be selected depending upon the nature of the odor to be controlled. If it is desired to use the package for insect or pest control the cartridge will be formed of a suitable contact insecticide or the like which will be effective in controlling the particular pest or insect.

The container 12 is of special construction. It is formed, preferably, of a suitable plastic material with a closed bottom wall forming panel 16, a cylinder forming side wall 18 and an open mouth portion 20 having a threaded outer surface for receiving a screw-on top or lid 22 for closing the same. The side wall 18 is provided with a plurality of openings 24 which may be of the same or different configuration and provide sufficient area for the passage of vapor when a cartridge 14 of a deodorant material is used so as to afford access to the control material. The bottom panel 16 is provided with an upstanding or inwardly projecting portion or male member 26 while a like member 28 depends from the top wall forming panel 30 in vertical alignment with the member 26, the two members 26 and 28 being on the central axis of the container 12. The two projecting male members are adapted to be received in the female recesses 32 and 34 in the end, or bottom and top walls 36 and 38 of the cartridge member 14 so as to hold the member 14 in fixed position in the container 12. The top panel 30 of the lid member 22 has on its outer surface a sheet 40 of double faced pressure sensitive adhesive tape with a strippable cover sheet 42 which may be removed to enable the package 10 to be adhesively attached for suspension beneath a shelf 44, for example, as illustrated in FIG. 4 of the drawings.

The cartridge 14, in the form illustrated, is generally cylindrical and of solid material with the top and bottom ends centrally recessed at 32 and 34 to receive the male anchoring members 26 and 28 when enclosed in the container 12 for use. The side wall 46, preferably, is fluted or provided with axial indentations 48 so as to increase the surface exposure in the case of material which will vaporize and to provide a ribbed surface which a rodent may bite into more easily. The over-all diameter of the cartridge is of smaller dimension than the corresponding inside dimension of the container 12 to provide space for better circulation of air between the wall of the cartridge and the wall of the container.

The size of the container 12, the nature and size of the cartridge 14 will, of course, depend upon the pest it is desired to control. The size and character of the openings 24 may be varied according to the nature of the material enclosed and the pest of which it is to be used so as to provide adequate escape of vapor or adequate access to the control material when it must be contacted or eaten by the pest to be effective.

A package of modified form is illustrated in FIG. 5 which is especially designed for use with a cartridge of material for controlling rodents, such as, rats or mice, where it is necessary for the rodent to contact or eat of the cartridge material. The latter may be in the form of poisoned bait, for example, confectioner nucoa, which has a high melting point, mixed with peanut butter, bird seed, barley, etc. and flavored with anise as an attractant. The package 110 in FIG. 5 comprises a container 112 enclosing a cartridge 114 which may be of the same general structure as the cartridge 14 with the desired composition. The container 112 is provided with a lid 122 of the same character as the lid 22 and the container side wall will be apertured with some of the holes 124 large enough to permit the rodent to reach the material so as to contact or chew on the cartridge 114. The cartridge exterior surface may be ribbed or indented in the same manner as the cartridge 14 in FIG. 3 to facilitate chewing engagement by the rodents. The container and cartridge arrangement of FIG. 5 may be otherwise the same as the carton and cartridge of FIGS. 1 to 4. It will be understood, of course, that the container of FIG. 5 may be derived by a user modifying the container of FIG. 1 since it merely requires cutting the larger holes in the side wall to convert the container of FIG. 1 for rodent control use.

I claim;

1. A package for use in controlling pests within a area which comprises a container of generally tubular form and having end closures, one of which is removable and replaceable, said container having apertures in at least one wall thereof providing access to the interior, and a replaceable cartridge of pest control material which is in a solid state enclosed within said container with the outer side wall of said cartridge spaced from the inner side wall of said container, and cooperating male and female members in the container and cartridge ends constituting means for holding said cartridge in a relatively fixed position in said container.

2. A package for use in controlling pests within an area which comprises a container of generally tubular form and having end closures, one of which is removable and replaceable, said container having apertures in at least one wall thereof providing access to the interior, and a replaceable cartridge of pest control material which is in a solid state enclosed within said container, and means for holding said cartridge in a relatively fixed position in said container which holding means comprises inwardly projecting male members in opposite ends of the container and recesses in opposite ends of said cartridge which form female members for receiving said container male members therein.

3. A package for use in controlling pests within a area which comprises a container of generally tubular form and having end closures, one of which is removable and replaceable, said container having apertures in at least one wall thereof providing access to the interior, and a replaceable cartridge of pest control material which is in a solid state enclosed within said container, said cartridge of pest control material having female forming recesses in opposite ends for co-operation with male members in the container in holding the cartridge in relatively fixed position in the container and the interconnecting side walls of said cartridge having indentations in the surface for increasing the surface exposed for dispensing contact.

4. A package as set forth in claim 1 wherein said container is of cylindrical form with a screw-on lid and having a pressure sensitive adhesive on the top surface with a peelable cover member.

5. A package for use in controlling pests within an area which comprises a container of cylindrical form with a removable and replaceable lid member, said container having apertures in at least one wall thereof providing access to the interior, and a replaceable cartridge of pest control material which is in a solid state enclosed within said container, and means for holding said cartridge in a relatively fixed position in said container, which holding means includes a projection on the inner face of said lid member for co-operation with a recess in said cartridge of pest control material so as to center the cartridge in the body of the container.

6. A package as set forth in claim 1 wherein said container is of cylindrical form and said cartridge of pest control material has a cross sectional diameter smaller than the corresponding dimension of said container and wherein said means for holding said cartridge in position is arranged to center the cartridge in the container.

7. A package as set forth in claim 6 wherein certain of said container side wall apertures are enlarged to a size sufficient to permit a rodent to reach a cartridge therein and chew on it.

* * * * *